2,848,518
Patented Aug. 19, 1958

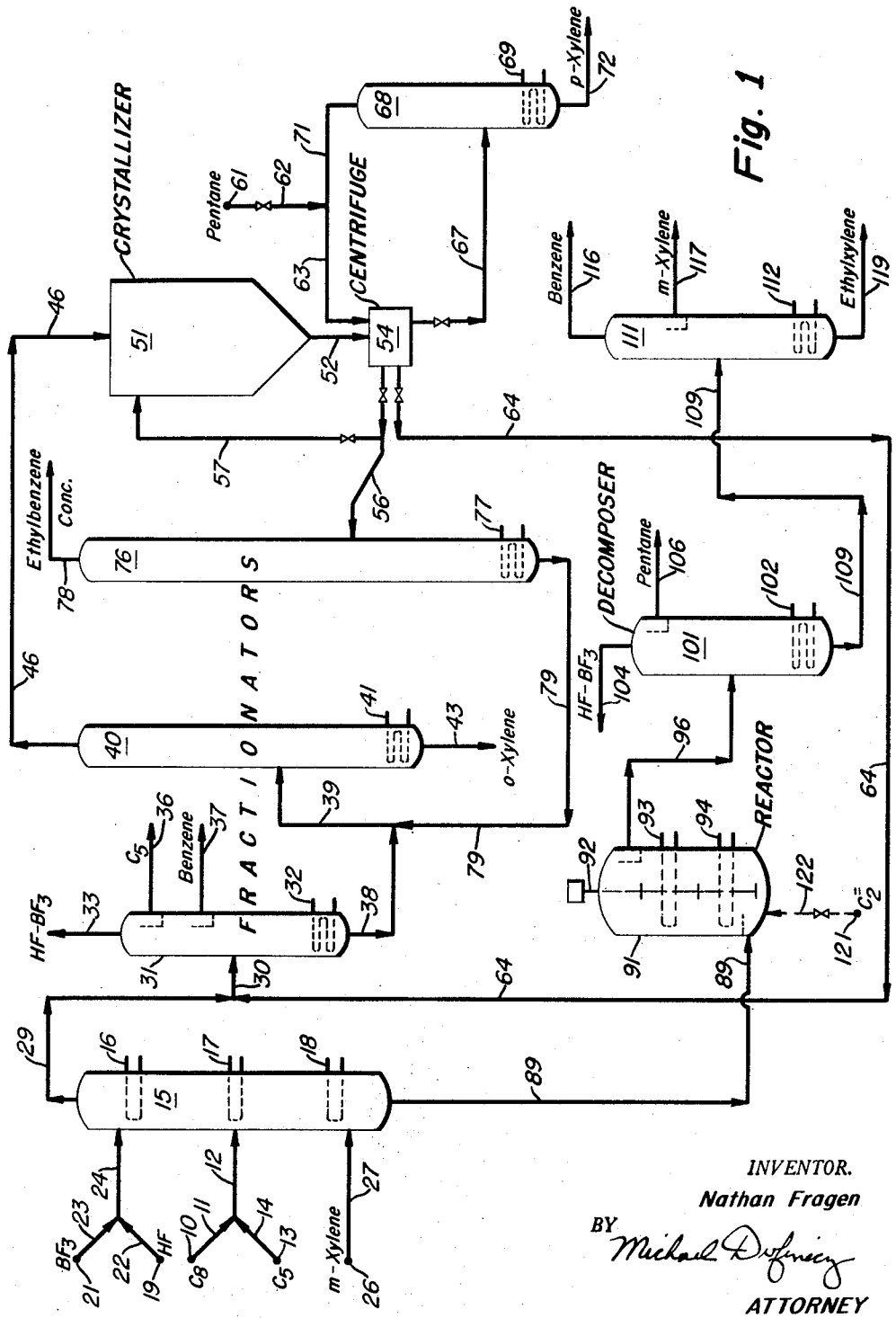

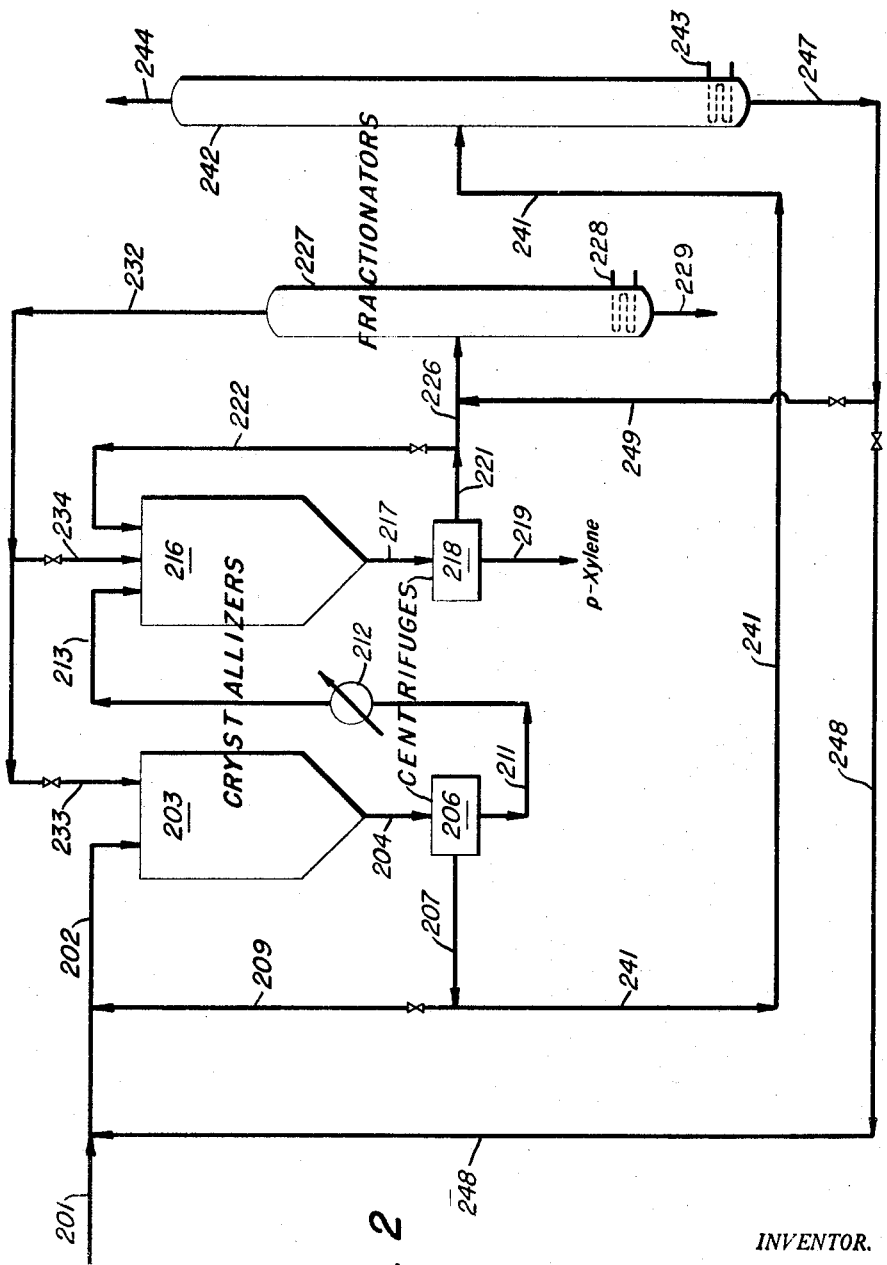

2,848,518
C₈ AROMATIC HYDROCARBON SEPARATION

Nathan Fragen, Hammond, Ind., assignor to Standard Oil Company, Chicago, Ill., a corporation of Indiana Application July 26, 1954, Serial No. 445,597

4 Claims. (Cl. 260—674)

This invention relates to the separation of a mixture of $C_8$ aromatic hydrocarbons into the individual xylene isomers and ethylbenzene. More particularly the invention relates to the treatment of a mixture of $C_8$ aromatic hydrocarbons to recover essentially pure o-xylene, m-xylene, p-xylene, ethylbenzene and some 1,3-dimethyl-5-ethylbenzene.

Presently there exists a very large demand for high purity o-xylene for the production of phthalic anhydride; high purity p-xylene for the production of synthetic resins; and ethylbenzene for the preparation of styrene polymers. One ethylbenzene derivative, 1,3-dimethyl-5-ethylbenzene, i. e., 1,3,5-ethylxylene, is of considerable interest as a source of styrene-type resin having a softening point above the boiling point of water. Presently the chief use for m-xylene is as a solvent.

Distillates obtained from the catalytic reforming, in the presence of hydrogen, of petroleum naphthas contain very large amounts of the $C_8$ aromatic hydrocarbons which exist in about the thermodynamic equilibrium distribution. Today it is possible to obtain a $C_8$ aromatic hydrocarbon fraction from petroleum sources, which fraction contains essentially no non-aromatic hydrocarbon constituents.

It is an extremely complex problem to separate a natural mixture of $C_8$ aromatic hydrocarbons into their individual constituents. Usually the xylene fraction is superfractionated to produce a bottoms product containing about 80% of the o-xylene. The overhead which contains m-xylene, p-xylene, ethylbenzene and some o-xylene is then subjected to crystallization in order to separate out high purity p-xylene. Unfortunately, this technique results in the production of a fraction containing substantially all the m-xylene and the ethylbenzene. This m-xylene-ethylbenzene fraction is not readily separable except by selective alkylation of the m-xylene. The problem of recovery of the o-xylene by fractionation and the p-xylene by crystallization is considerably simplified if m-xylene is removed from the xylene feed before the crystallization operation.

An object of the invention is the separation of a $C_8$ aromatic hydrocarbon mixture into the various $C_8$ isomers. Another object of the invention is the separation of a $C_8$ aromatic hydrocarbon mixture under conditions to maximize the recovery of essentially pure o-xylene and p-xylene and high purity ethylbenzene. Still another object is a process for the separation of a mixture containing only the xylene isomers and ethylbenzene into essentially pure o-xylene, p-xylene, m-xylene, high purity ethylbenzene and 1,3-dimethyl-5-ethylbenzene under conditions wherein degradation of o-xylene and p-xylene is substantially eliminated.

Figure 1 shows an illustrative embodiment of the process wherein an ethylbenzene, o-xylene, and p-xylene stream is distilled before separation by crystallization.

Figure 2 shows an illustrative embodiment of the process wherein an ethylbenzene, o-xylene, and p-xylene stream undergoes crystallization separation before distillative separation.

The process of this invention comprises: A feed, consisting essentially of a mixture of all the xylene isomers and ethylbenzene is contacted with $HF$—$BF_3$ treating agent under conditions of temperature, time, and $BF_3$ usage such that the m-xylene and some of the ethylbenzene (as diethylbenzene and ethylxylene) is extracted into the $HF$—$BF_3$ acid phase; the raffinate phase contains substantially all the o-xylene and p-xylene and unconverted ethylbenzene. The raffinate phase is freed of $HF$ and $BF_3$ and is then distilled to obtain a bottoms product consisting of high purity o-xylene and a fraction containing the $C_8$ aromatic hydrocarbons not removed in the bottoms product. This fraction is chilled to obtain only crystals of p-xylene and a mother liquor. The mother liquor is distilled to obtain a high purity ethylbenzene fraction and a mixture of o-xylene, p-xylene, and ethylbenzene. The $HF$—$BF_3$ acid phase is then contacted under conditions of time and temperature so controlled that essentially all the ethylbenzenes interact with xylene to produce 1,3-dimethyl-5-ethylbenzene and benzene as essentially the only interaction products and the o-xylene and p-xylene present (if any) are isomerized to m-xylene; these are recovered from the acid phase.

Another process subjects the raffinate to crystallization at a temperature such that crystals of both o-xylene and p-xylene are formed; these crystals are separated from a mother liquor. The mixture of crystals is recrystallized at a temperature such that only essentially pure p-xylene crystals are formed; these are separated from a mother liquor consisting essentially of a eutectic mixture of o-xylene and p-xylene. The eutectic mixture is distilled to recover an essentially pure o-xylene product. The mother liquor from the first crystallization is distilled to recover a high purity ethylbenzene product.

The invention is described in conjunction with the drawings which drawings form a part of this specification. It is to be understood that the drawings are schematic in nature and that many items of process equipment have been omitted as these may be readily added by one skilled in the art.

In Figure 1, feed from source 10 is passed by way of line 11 into line 12. The feed to the process is a mixture of o-xylene, p-xylene, m-xylene, and ethylbenzene—either a natural mixture or one made up by fractions from various conversion processes. The xylene mixture is essentially pure with respect to non-aromatic hydrocarbon constituents, i. e., contains essentially no non-aromatic hydrocarbons boiling in the xylene boiling range of 135°–144° C. It is desirable to dilute the xylene feed with a low boiling hydrocarbon which is readily separable from the xylenes by distillation. Examples of suitable hydrocarbons are pentane and hexane; or a higher boiling hydrocarbon may be used as a diluent, although this is not preferred because of the increased difficulty of separation by fractional distillation. The total feed preferably consists of about 50 volume percent of the $C_8$ aromatic hydrocarbons and the remainder diluent non-aromatic hydrocarbons. In this illustration, the feed consists of an essentially pure xylene fraction derived by solvent extraction of a hydroformate. The xylene fraction contains, on a volume basis, o-xylene, 21.1 volumes; m-xylene, 36.8 volumes; p-xylene, 15.8 volumes; and ethylbenzene, 26.3 volumes. The feed has been diluted with pentane from source 13 to have a paraffinic content of about 50 volume percent. The pentane is passed by way of line 14 in line 12. The combined stream is passed into extractor 15.

Extractor 15 is a conventional countercurrent contacting tower which may be provided with any of the various conventional methods for obtaining efficient contacting between two immiscible liquids. Extractor 15 may be operated at constant temperature from top to bottom or by the use of heat exchanger means 16, 17, and 18, the temperature may be varied over the height of the tower. A substantially constant temperature is maintained throughout the tower at +10° C.

The temperature and time of contacting between the $C_8$ aromatic hydrocarbons and the HF—$BF_3$ treating agent must be so controlled that essentially no isomerization of the o-xylene and p-xylene takes place. In general, a suitable temperature of operation is between about —40° C. and +30° C. At these temperatures, the time of contacting may be between about 2 minutes and 30 minutes. The shorter the time of contacting, the better, particularly at the higher temperatures. It is preferred to operate at a temperature between about —10° C. and +10° C. and for a time of contacting of not more than about 20 minutes. The time of contacting in this embodiment in extractor 15 is 15 minutes.

The feed may be introduced at various points along the height of extractor 15. However, in this embodiment, all the feed is introduced at a point just below the vertical mid-point of extractor 15.

At an upper point of extractor 15, liquid HF from source 19 and $BF_3$ from source 21 are passed by way of lines 22 and 23 respectively, into line 24 and therefrom into extractor 15.

The contacting is carried out under substantially anhydrous conditions and the liquid HF contains not more than about 3% of water. In this embodiment, commercial grade anhydrous liquid HF is used.

Sufficient liquid HF must be used to exceed the solubility thereof in the hydrocarbons and also to participate in the formation of a complex along with $BF_3$ and the xylenes in the feed. In general, between about 5 and about 50 moles of liquid HF are used per mole of m-xylene in extractor 15. More usually the usage of liquid HF is between about 7 and 15 moles. In this embodiment, 11 moles of liquid HF are used per mole of m-xylene in extractor 15.

It is known that $BF_3$ and HF combine with xylene to form complexes having different stabilities. The complex of m-xylene is the most stable. By adjusting the amount of $BF_3$, it is possible to separate m-xylene from o-xylene and p-xylene. The m-xylene appears in the HF—$BF_3$ acid phase and the o-xylene and p-xylene appear as a raffinate phase. By the use of countercurrent contacting in a tower providing about 5 theoretical stages, it is possible to separate a mixture of xylene isomers into an acid phase containing m-xylene and substantially no o-xylene and p-xylene and a raffinate phase containing o-xylene, p-xylene, and maybe some m-xylene (dependent on the $BF_3$ usage). In order to accomplish the separation with minimum loss of o-xylene and p-xylene to the acid phase, the $BF_3$ usage is adjusted to about 1 mole per mole of m-xylene present in extractor 15.

The ethylbenzene present is very rapidly disproportionated to diethylbenzene and benzene and also may interact with xylene to form ethylxylene. The diethylbenzene and ethylxylene form stable complexes with HF and $BF_3$ and in order to permit good separation of the xylene isomers, it is necessary to provide additional $BF_3$ for the complexing of any diethylbenzene and ethylxylene formed. Therefore, in addition to the about 1 mole of $BF_3$ per mole of m-xylene present, not more than about 0.5 mole of $BF_3$ may be introduced per mole of ethylbenzene present in extractor 15. In this embodiment, the $BF_3$ usage is 1 mole per mole of m-xylene and 0.2 mole per mole of ethylbenzene, in order to decrease the amount of ethylbenzene disproportionated.

In order to improve the degree of separation, a reflux stream of high purity m-xylene from source 26 is introduced by way of valved line 27 into extractor 15 at a point somewhat above the exit point for the acid phase. The amount of m-xylene refluxed will vary with the conditions of operation in extractor 15. In this embodiment, about 3 moles of m-xylene are refluxed per mole of m-xylene in the feed.

A raffinate phase comprising benzene, o-xylene, p-xylene, ethylbenzene and pentane is withdrawn from the top of extractor 15 by way of line 29 and is introduced by way of line 30 into fractionator 31. Fractionator 31 is shown schematically and is provided with an internal reboiler 32. The temperature in fractionator 31 is so adjusted that HF and $BF_3$ occluded in the raffinate phase are removed overhead and are recycled to extractor 15 by way of line 33 and other lines not shown. Pentane diluent is withdrawn by way of line 36 and recycled to extractor 15 by lines not shown. Benzene produced by the disproportionation (and interaction) is withdrawn by way of line 37 and is sent to storage not shown.

The bottoms fraction produced in fractionator 31 consists of essentially all of the o-xylene and p-xylene and about 75% of the ethylbenzene in the feed from source 10. This fraction is withdrawn by way of line 38 and is passed by way of line 39 into fractionator 40, which is provided with reboiler 41. Fractionator 40 is so designed that an o-xylene bottoms product of about 99% purity is obtained; the o-xylene is withdrawn by way of line 43 and sent to storage not shown. In this operation, an o-xylene yield of 80% on o-xylene charged to fractionator 40 is obtained.

An overhead fraction is withdrawn by way of line 46 and is passed through heat exchanger means not shown where it is cooled to operating temperature and is passed into crystallizer 51. The charge from line 46 is approximately o-xylene, 11%; p-xylene, 39%, and ethylbenzene, 50%.

Crystallizer 51 represents schematically a vessel or vessels for separating crystals of p-xylene from a mother liquor. Any of the conventional types of crystallizers may be utilized herein. Crystallizer 51 is operated at a temperature sufficiently low to crystallize out only p-xylene, i. e., essentially pure p-xylene. The exact temperature of operation will be determined by the type of feed to crystallizer 51 and the amount of p-xylene which is desired to be separated out. In general, the temperature of operation in crystallizer 51 is between about —15° C. and about —70° C. In this embodiment, the temperature of operation of crystallizer 51 is —65° C.

Crystals of p-xylene are withdrawn from the bottom of crystallizer 51 by way of line 52 and passed to centrifuge 54 wherein mother liquor is separated from the crystals. Other methods of separating mother liquor and crystals may be utilized.

Mother liquor is withdrawn from centrifuge 54 by way of valved line 56. This mother liquor has the approximate composition, o-xylene, 18%; p-xylene, 6%, and ethylbenzene, 76%. In order to maintain the slurry in crystallizer 51 at between about 20 and 40% of the contents, a portion of the mother liquor from line 56 is recycled by way of valved line 57 into crystallizer 51.

The purity of the p-xylene is improved by washing the crystals with pentane, which is introduced from source 61 by way of lines 62 and 63 into centrifuge 54. The pentane washings are removed by way of line 64 and recycled to line 30 for charge to fractionator 31. Other methods of washing the crystals may be used.

Essentially pure p-xylene crystals covered with pentane are withdrawn from centrifuge 54 by way of line 67 and passed to fractionator 68, provided with reboiler 69. Pentane is removed and recycled by lines 71 and 63. Pure p-xylene is passed to storage by line 72.

The mother liquor not required for recycle is passed by way of line 56 into fractionator 76 which is provided with reboiler 77. In fractionator 76, an ethylbenzene concentrate product containing about 90% ethylbenzene and about 10% p-xylene is taken overhead. This high purity ethylbenzene product is passed to storage by way of line 78. In fractionator 76, about 90% of the ethylbenzene charged and about 50% of the p-xylene charged are taken overhead. A bottoms fraction consisting principally of o-xylene is withdrawn and recycled by way of lines 79 and 39 to fractionator 40.

The acid phase is withdrawn from extractor 15 by way of line 39 and is introduced into reactor 91. Reactor 91 is a vessel provided with motor driven agitator 92 and heat exchanger means 93 and 94. In reactor 91 the materials are contacted at a temperature and time relationship such that essentially all the ethylbenzenes interact with xylene to form 1,3-dimethyl-5-ethylbenzene and any o-xylene and p-xylene present isomerize to m-xylene. In general, the temperature in reactor 91 is maintained between about +10° C. and +175° C. Preferably the temperature is between about 30° C. and about 75° C. and the time of contacting is between about 15 minutes and about 6 hours wherein the longer times correspond to the lower temperatures. In this embodiment, the temperature in reactor 91 is 75° C. and the time is 15 minutes.

Material is withdrawn from an upper point of reactor 91 and is passed by way of line 96 into decomposer 101. Decomposer 101 is provided with internal heat exchanger 102. Decomposer 101 is a vessel adapted for quickly removing HF and $BF_3$ from the acid phase. The HF and $BF_3$ must be removed under conditions of time and temperature such that no disproportionation of the m-xylene to trimethylbenzenes occurs. A suitable temperature is 50° C. HF and $BF_3$ are taken overhead by way of line 104 and are recycled for reuse in the process. A pentane fraction is shown as being removed overhead by way of line 106 and is recycled for reuse in the process.

The reaction product mixture produced in reactor 91 is recovered as a bottoms fraction from decomposer 101. This reaction product mixture consists of benzene, m-xylene, and 1,3-dimethyl-5-ethylbenzene (1,3,5-ethylxylene). The reaction product mixture is removed from decomposer 101 by way of line 109 and is passed into fractionator 111; a reboiler 112 is provided in fractionator 111. There is shown schematically as being withdrawn from fractionator 111 a benzene fraction by way of line 116, m-xylene fraction by way of line 117, and a 1,3,5-ethylxylene fraction by way of line 119.

In this illustrative embodiment, the $C_8$ feed is separated into the following essentially pure product fractions, except for the ethybenzene which is 90% purity.

| Fraction | Total Product, Percent | Recovery, Percent on Feed |
| --- | --- | --- |
| o-xylene | 20.6 | 98 |
| m-xylene | 30.3 | 82 |
| p-xylene | 14.9 | 95 |
| ethylbenzene | 20.2 | [1] 74 |
| ethylxylene | 7.0 | [1] 26 |
| benzene | 7.0 | [1] 26 |

[1] Based on ethylbenzene in the feed.

Should the demand for 1,3-dimethyl-5-ethylbenzene increase beyond that obtainable from the feed from source 11, additional m-xylene may be converted to the desired 1,3-dimethyl-5-ethylbenzene by introducing ethylene from source 121 by way of valved line 122 (shown dotted) into reactor 91.

In Figure 2 there is shown another method of carrying out the separation of the m-xylene from $C_8$ aromatic hydrocarbons. In Figure 2, line 201 contains a raffinate stream consisting of essentially pure o-xylene, p-xylene, and ethylbenzene derived by the procedure shown in extractor 15 and fractionator 31 of Figure 1.

Material from line 201 and recycle material from other sources is passed by way of line 202 into crystallizer 203. The remarks made with respect to crystallizer 51, in Figure 1, also apply to crystallizer 203. Crystallizer 203 is operated at a temperature low enough to crystallize not only p-xylene, but also o-xylene. In general, crystallizer 203 is operated at between about −50° C. and about −110° C. In this embodiment, the temperature is about −90° C.

A mixture of crystals of o-xylene and p-xylene is withdrawn from the bottom of crystallizer 203 and is passed by way of line 204 into centrifuge 206. Other methods of separating crystals from mother liquors may be utilized. Mother liquor is withdrawn by way of line 207.

In order to maintain the slurry in crystallizer 203 at between about 20% and 40% of the contents, a portion of the mother liquor in line 207 is recycled by way of valved line 209 to line 202. In this embodiment, the slurry is held at about 30%. The composition of the mother liquor in line 207 is approximately o-xylene, 10%; p-xylene, 3%; and ethylbenzene, 87%.

The mixture of o-xylene and p-xylene is passed from centrifuge 206 by way of line 211, heat exchanger 212 and line 213 into crystallizer 216. Herein the crystals have been melted and the liquid passed to crystallizer 216; however, the same result can be obtained by fractional melting methods. Crystallizer 216 is operated at about the freezing point of the eutectic mixture of o-xylene and p-xylene, i. e., about −35° C. The usual operating temperatures in crystallizer 216 are between about −30° C. and −35° C. In this embodiment, the temperature is −33° C.

The slurry from crystallizer 216 is passed by way of line 217 into centrifuge 218. Essentially pure p-xylene crystals are separated and are sent by way of line 219 to storage. In this embodiment, about 70% of the p-xylene charged to crystallizer 216 are recovered per pass.

A second mother liquor is withdrawn from centrifuge 218 by way of line 221. Some mother liquor is recycled by way of valved line 222 into crystallizer 216 in order to maintain slurry conditions at between about 20% and 40%, preferably 30%.

The remaining mother liquor from line 221 is passed by way of line 226 into fractionator 227, which is provided with reboiler 228. Fractionator 227 is constructed and operated to produce a bottoms product containing 99+% of o-xylene. The o-xylene product fraction is withdrawn by line 229 and passed to storage not shown.

The overhead fraction from fractionator 227 contains about 75% p-xylene and may be sold for p-xylene concentrate. Preferably this fraction is withdrawn by way of line 232 and is recycled either to crystallizer 203 by way of valved line 233 or to crystallizer 216 by way of valved line 234.

Mother liquor from line 207 is passed by way of line 241 into fractionator 242, which is provided with reboiler 243. Fractionator 242 is operated under conditions to take overhead by way of valved line 244 a high purity ethylbenzene product fraction containing in excess of 90% of ethylbenzene—the remainder is p-xylene. About one-half of the p-xylene charged goes overhead. A bottoms fraction of o-xylene, p-xylene and ethylbenzene—about 20% of the charge—is withdrawn as a bottoms fraction and is recycled to line 202 by way of lines 247 and 248. Or this stream may be recycled to fractionator 227 by way of lines 247 and 249.

In this mode of operation, the $C_8$ feed is separated into the following essentially pure product fractions, except for the ethylbenzene which is in excess of 90% purity.

| Fraction | Total Product, Percent | Recovery, Percent on Feed |
| --- | --- | --- |
| o-xylene | 20.6 | 93 |
| m-xylene | 30.3 | 82 |
| p-xylene | 15.3 | 97 |
| ethylbenzene | 19.8 | [1] 74 |
| ethylxylene | 7.0 | [1] 26 |
| benzene | 7.0 | [1] 26 |

[1] Based on ethylbenzene in the feed.

Thus having described the invention, what is claimed is:

1. A process which comprises (1) contacting, under substantially anhydrous conditions (a) a feed containing o-xylene, m-xylene, p-xylene and ethylbenzene as essentially the only xylene boiling range hydrocarbon constituents and essentially no hydrocarbons reactive therewith, with (b) an HF—$BF_3$ treating agent consisting essentially of about 1 mole of $BF_3$ per mole of m-xylene plus not more than 0.5 mole of $BF_3$ per mole of ethylbenzene and between about 5 and 50 moles of liquid HF per mole of m-xylene, at (c) a temperature between about —40° C. and +30° C. for a time between about 2 minutes and 30 minutes, to essentially avoid isomerization of o-xylene and p-xylene, (2) separating a raffinate phase comprising benzene, o-xylene, p-xylene and ethylbenzene, from an extract phase comprising HF, $BF_3$, m-xylene, $C_{10}$ aromatic hydrocarbons and substantially no o-xylene and p-xylene, (3) removing HF and $BF_3$ from said raffinate phase to obtain a raffinate, (4) distilling said raffinate under conditions to obtain a bottoms product consisting of high purity o-xylene and a fraction consisting substantially of p-xylene, o-xylene and ethylbenzene, (5) chilling said fraction to a temperature between about —15° C. and about —70° C., to produce essentially only crystals of p-xylene, (6) removing mother liquor to obtain crystals of essentially pure p-xylene, (7) distilling said mother liquor under conditions to obtain a high purity ethylbenzene product fraction and a fraction containing substantially only o-xylene and p-xylene, and (8) removing HF and $BF_3$ from said extract phase to recover a high purity m-xylene product.

2. The process of claim 1 wherein the mixed xylene fraction of step (7) is recycled to the distillative zone of step (4).

3. A process which comprises (1) contacting, under substantially anhydrous conditions (a) a feed containing o-xylene, m-xylene, p-xylene and ethylbenzene as essentially the only xylene boiling range hydrocarbon constituents and essentially no hydrocarbons reactive therewith, with (b) an HF—$BF_3$ treating agent consisting essentially of about 1 mole of $BF_3$ per mole of m-xylene plus not more than 0.5 moles of $BF_3$ per mole of ethylbenzene and between about 5 and 50 moles of liquid HF per mole of m-xylene, at (c) a temperature between about —40° C. and +30° C. for a time between about 2 minutes and 30 minutes, to essentially avoid isomerization of o-xylene and p-xylene, (2) separating a raffinate phase comprising benzene, o-xylene, p-xylene and ethylbenzene from an extract phase comprising HF, $BF_3$, m-xylene, $C_{10}$ aromatic hydrocarbons and substantially no o-xylene and p-xylene, (3) removing HF and $BF_3$ from said raffinate phase to obtain a raffinate, (4) chilling said raffinate to a temperature between about —50° C. and about —110° C. to produce a mixture of crystals of p-xylene and o-xylene, (5) separating said crystals from mother liquor, (6) recrystallizing said crystals at a temperature between —30° C. and —35° C. to obtain crystals of essentially pure p-xylene and a second mother liquor consisting essentially of about the eutectic mixture of o-xylene and p-xylene, (7) separating said p-xylene crystals from said second mother liquor, (8) distilling said second mother liquor to obtain an essentially pure o-xylene fraction and a fraction consisting essentially of o-xylene and p-xylene, (9) distilling the mother liquor from step (5) to obtain a high purity ethylbenzene product and a fraction containing substantially only o-xylene and p-xylene and (10) removing HF and $BF_3$ from said extract phase to recover a high purity m-xylene product.

4. The process of claim 3 wherein the fractions consisting essentially of o-xylene and p-xylene of steps (8) and (9) are cycled to a recrystallization zone.

References Cited in the file of this patent

UNITED STATES PATENTS

| | | |
|---|---|---|
| 2,511,711 | Hetzner et al. | June 13, 1950 |
| 2,528,892 | Lien et al. | Nov. 7, 1950 |
| 2,532,276 | Birch | Dec. 5, 1950 |
| 2,564,073 | Lien et al. | Aug. 14, 1951 |
| 2,667,446 | Findlay | Jan. 26, 1954 |